Dec. 7, 1954
N. J. ALLBRIGHT
2,696,442
METHOD OF PROCESSING MEAT
Filed Feb. 28, 1950
2 Sheets-Sheet 2
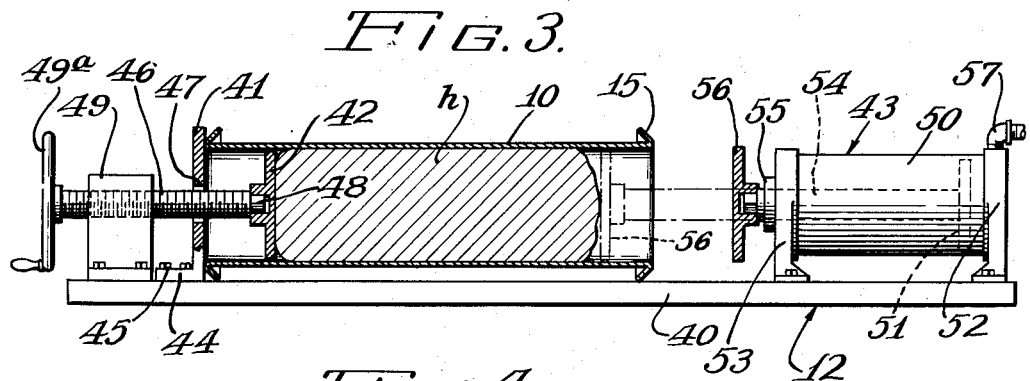
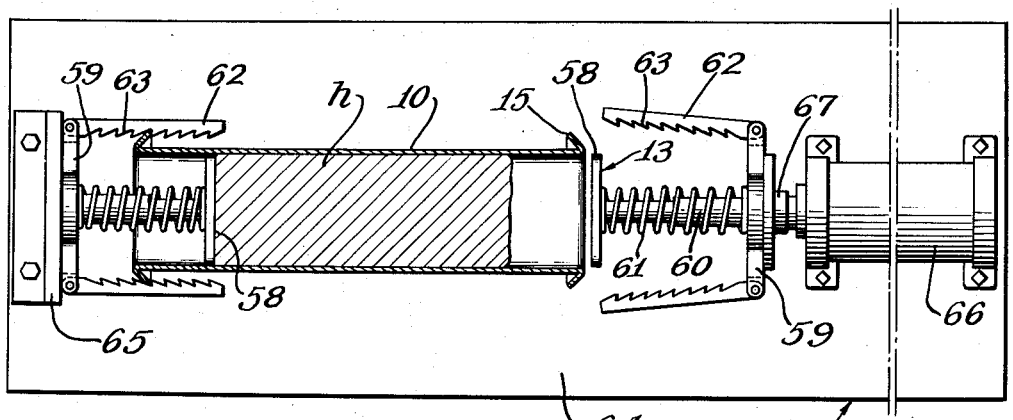
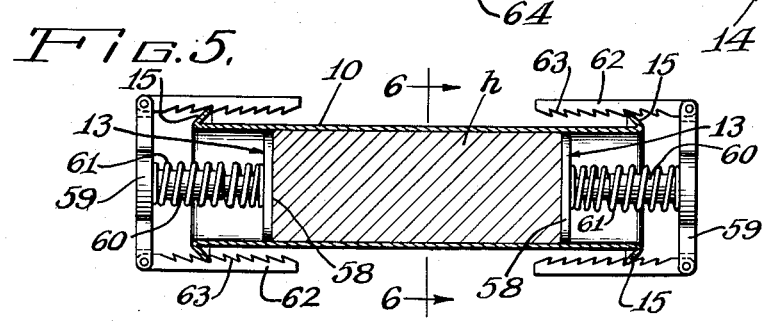
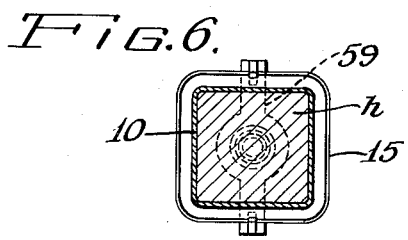
Inventor:
Norman J. Allbright
By Fred Gerlach
Atty.

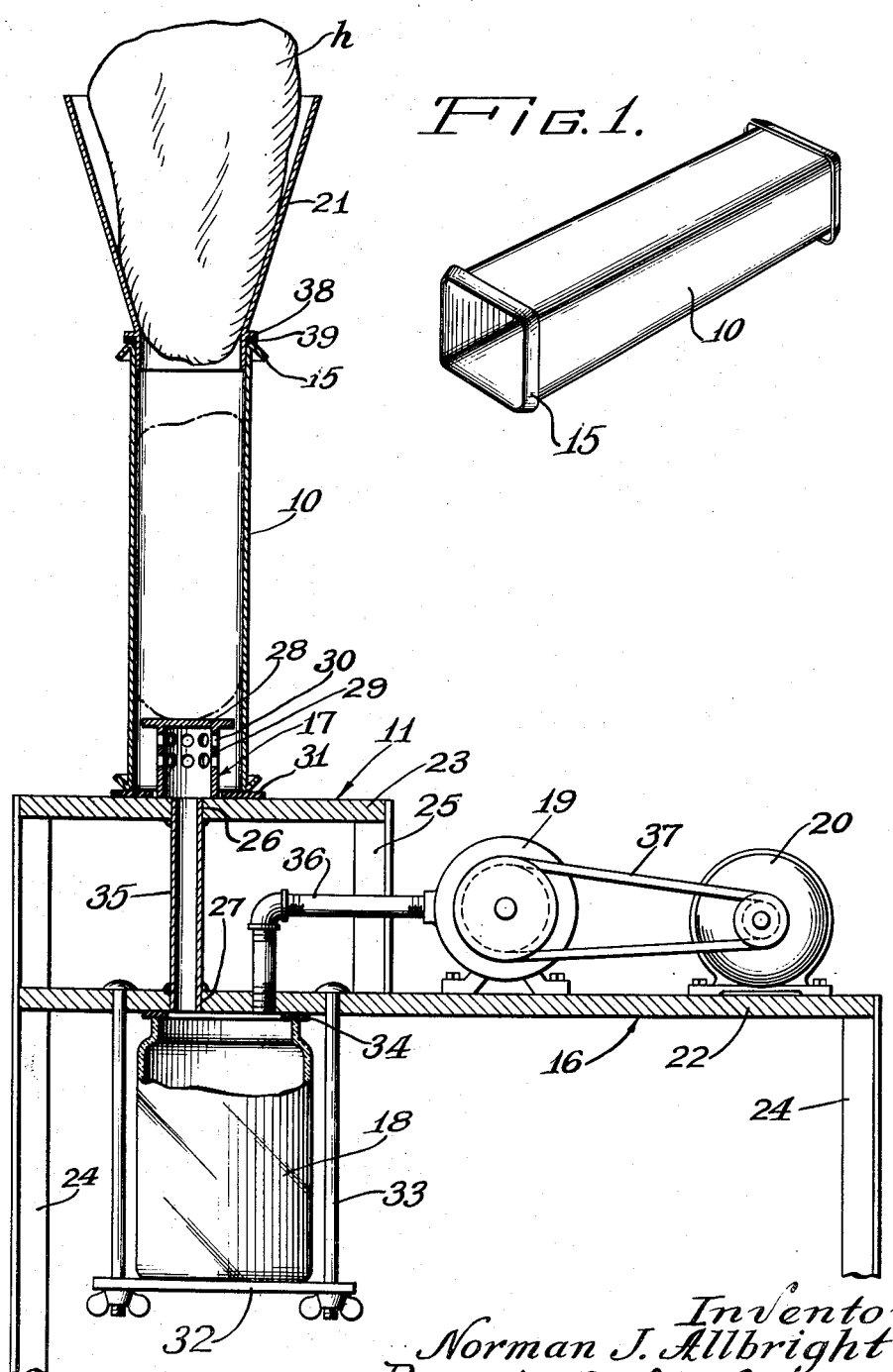

United States Patent Office 2,696,442
Patented Dec. 7, 1954

2,696,442

METHOD OF PROCESSING MEAT

Norman J. Allbright, Hinsdale, Ill., assignor to The Allbright-Nell Company, Chicago, Ill., a corporation of Illinois Application February 28, 1950, Serial No. 146,854

5 Claims. (Cl. 99—187)

The present invention relates to the art of processing as a preliminary to sale or use, fresh boneless meat, such, for example, as hams.

It has heretofore been common practice in meat packing establishments to process fresh boneless hams by first inserting them into open top, cup-shaped containers and then applying to the containers spring loaded covers which serve to place the hams under compression. After application of the covers the containers are placed in hot water or a cooking environment until the hams are cooked to the desired extent. At the conclusion of the cooking operation the containers are placed in a chilling compartment or low temperature atmosphere in order to solidify the hams. Because the hams vary in weight and size they are not, after cooking, of uniform height and hence when sliced the slices may not be used to best advantage in sandwiches, the bread slices of which are of uniform size.

One object of this invention is the provision of a ham processing method which contemplates as a preliminary to cooking and chilling, endwise introduction of a fresh boneless ham into an open ended tubular container which is of uniform cross section from end to end but is of less cross section than the large end of the ham and causes the ham, regardless of size or weight, to be so compressed that it is of predetermined cross section throughout its entire length and hence after cooking and chilling may be cut into slices which are all of uniform size and may be used advantageously in making sandwiches. In general the method comprehends first positioning a funnel shaped member so that the small end thereof is in sealed and communicating relation with one end of a rigid tubular container of less cross sectional area than the maximum cross sectional area of the ham, then placing the ham in the funnel shaped member so that the small end thereof faces said one end of the container, and then creating a pressure differential whereby the ambient air around the large end of the ham is under such greater pressure than the air within the container as to force the ham bodily into the container. More specifically, the method comprehends after introducing the ham into the funnel shaped member, applying suction to the other end of the container to the end that the subatmospheric pressure within the container and the atmospheric pressure on the exposed large end of the ham coact to cause the ham to slide bodily and completely into the container.

Another object of the invention is the provision of a ham processing method which includes as additional steps compressing the ends of the ham endwise after introduction of the ham into the container and then applying spring loaded covers to the ends of the container in order to maintain the ends of the ham in a compressed condition during the subsequent or following cooking operation.

Other objects of the invention and the various advantages and characteristics of the present method will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective of an open ended tubular container for use in connection with the method constituting the invention;

Figure 2 is a vertical longitudinal section of an apparatus which is adapted for use in connection with the container of Figure 1 and serves after introduction of a ham into the funnel shaped member to create within the container interior sufficient suction to cause the ham to slide bodily into the container;

Figure 3 is a view partly in side elevation and partly in vertical section of a unit which is designed and adapted to apply endwise pressure on the ends of the ham after introduction of the ham into the container by the apparatus that is shown in Figure 2;

Figure 4 is a plan view of an auxiliary unit for applying spring loaded covers to the ends of the container after the ham in the container has been subjected to the action of the unit that is shown in Figure 3;

Figure 5 is a longitudinal section showing the container after application to the ends thereof of the spring loaded covers for maintaining the ends of the ham in the container in a compressed condition during cooking of the ham; and Figure 6 is a transverse section on the line 6—6 of Figure 5.

The invention comprehends processing a fresh boneless ham $h$ by first introducing it into a rigid container 10 by way of an apparatus 11 as shown in Figure 2, then compressing the ends of the ham in the container by a unit 12 as shown in Figure 3, then applying to the ends of the container spring loaded covers 13 by a unit 14 as shown in Figure 4, then sequentially subjecting the ham within the container to a cooking environment and a chilling atmosphere and finally removing the chilled and solidified ham from the container.

The container 10 is in the form of an open ended rigid tube, the interior of which is of uniform cross section from end to end. It is formed of stainless steel or other suitable metal and has at its ends continuous outwardly extending flanges 15. The cross sectional shape of the container 10 may be rectangular as shown, or it may be round, oval or any other desired configuration. It is contemplated, however, that the cross sectional area of the interior of the container will be materially less than the mean or average cross sectional area of the ham $h$ in order that when the ham is introduced into the container by the apparatus 11 it will be compressed laterally throughout its length and hence have the same cross sectional area as the container interior. As shown in Figure 2, the length of the container 10 is materially greater than the length of the ham $h$. The flanges 15 are inclined at approximately a 45° angle with respect to the side walls of the container and have a twofold purpose in that they serve as reenforcements for the container and also as anchoring means for the spring loaded covers 13.

The apparatus 11 serves in connection with use or operation thereof to introduce the ham $h$ lengthwise into the container. It comprises as its components or parts a supporting structure 16, a suction head 17, a trap 18, a suction pump 19, a pump driving electric motor 20 and a funnel 21. The supporting structure 16 of the apparatus 11 comprises a large sized lower platform 22 and a small sized upper platform 23. The lower platform is supported in an elevated position by means of legs 24 which are connected to, and depend from, the corner portions of the lower platform. The upper platform 23 is located over, and in spaced relation with, one end of the lower platform 22. It is supported by way of vertically extending legs 25 and has in its central portion a hole 26 which is vertically aligned with a hole 27 in the lower platform 22. The suction head is hollow and rests on, and is suitably secured to, the central portion of the upper platform 23. It is adapted to fit within the lower end of the open ended tubular container 10 as shown in Figure 2 of the drawings and consists of a horizontal top wall 28 and a cylindrical side wall 29. The side wall is connected to, and depends from, the top wall 28 and is arranged so that the lower end thereof surrounds and communicates with the hole 26 in the central portion of the upper platform 23. Holes 30 are formed in the central and upper portions of the side wall 29 and the lower end of the side wall is surrounded by a flat annular gasket 31 which is formed of rubber or any other suitable material and fits flatly against the upper surface of the upper platform 23 of the supporting structure 16. The trap 18 of the apparatus is in the form of an open top, transparent jar and, as shown in Figure 2, is located beneath the suction head 17 and underlies the end of the lower platform 22 that is beneath the upper platform 23. A bracket structure in the form of a horizontal plate 32 and vertically extending bolts 33 serves to support the trap 18 in its operative position. The open end of the trap surrounds, and is in communication with, the hole 27 in the lower platform 22. A gasket 34 is interposed between the open end of the trap and the superjacent portion of the lower platform. The interior of the trap communicates with the interior of the suction head 17 by way of a vertically extending tube 35, the upper end of which fits snugly within the hole 26 in the upper platform 23 and the lower end of which fits snugly within the vertically aligned hole 27 in the lower platform 22 of the supporting structure. The suction pump 19 is mounted on the lower platform 22 at one side of the upper platform 23 and has its suction side connected to the interior of the trap 18 by a pipe 36, one end of which is located adjacent the lower end of the tube 35 and extends through the lower platform 22 and the other end of which is connected to the casing of the pump. The electric motor 20 is mounted on the lower platform 22 outwards of the pump 19 and is operatively connected to the pump by way of a belt and pulley connection 37. One of the pulleys of such connection is fixed to one end of the armature shaft of the motor 20 and the other pulley of the connection is fixed to one end of the rotor shaft of the pump. When the pump 19 is driven by the electric motor 20 it operates to draw air into the suction head 17 via the holes 30, then through the tube 35, then through the trap 18 and finally through the pipe 36. The funnel 21 which forms a part of the apparatus 11 serves as a guide for the ham $h$ in connection with introduction of the latter into the container 10. The lower or small end of the funnel is shaped to fit within the upper end of the container 10 as shown in Figure 2 and has a continuous outwardly extending flange 38 for limiting downward movement of the funnel with respect to the container. A gasket 39 is secured to the bottom portion of the flange 38 and is adapted to rest on the upper end of the container and forms a seal between the funnel interior and the upper end of the container.

When it is desired to use the apparatus 11 to introduce the ham $h$ into the container 10 the container is first positioned vertically and is then manipulated so as to bring the lower end thereof into a position wherein it surrounds the suction head 17 and rests on the gasket 31. Thereafter the lower end of the funnel 21 is inserted into the upper end of the container. After proper positioning of the funnel the ham is inserted into the funnel in such manner that the small end thereof faces downwards. As soon as the ham is positioned within the funnel the lower small end slides into sealed relation with the upper end of the container. After properly positioning the ham within the funnel the electric motor 20 is started so as to effect operation of the suction pump 19. Operation of such pump creates a vacuum within the interior of the container. As soon as the suction within the interior of the container 10 reaches a certain point the uniform pressure of the ambient air on all of the exposed upper portions of the ham forces the ham downwards through the funnel 21 into the dotted line position that is shown in Figure 2. Downward movement of the ham is arrested by the small lower end of the ham striking against the top wall 28 of the suction head 17. The ham in connection with introduction thereof into the container is elongated while at the same time it is placed under lateral compression from end to end. The suction that is created in the lower end of the container results not only in the ham sliding downwards into the container but also in evacuation of air in any voids or pockets in the ham. Any liquid material which is withdrawn from the ham as the latter is drawn into the container flows downwards through the tube 35 and collects in the trap 18. In practice it has been found that when the ham and container are proportioned as shown creation of a vacuum of approximately twenty-four inches within the lower end of the container will result in substantially instantaneous introduction of the ham into the container. After the ham has been introduced into the container the funnel 21 is withdrawn from the upper end of the container and the container is removed from the upper platform 23 of the supporting structure 16.

The unit 12 is utilized after the ham $h$ has been introduced into the container 10 by way of the apparatus 11 and serves to apply endwise pressure to the ham in order uniformly to densify the ham. As its parts or components the unit comprises an elongated, horizontally extending platform 40, a vertically extending stop plate 41, an abutment plate 42, and a cylinder and piston device 43. The plates 41 and 42 are located at one end of the platform 40 and the cylinder and piston device 43 is located at the other end of the platform. Such device is spaced from the stop plate 41 a sufficient distance to permit the ham charged container 10 to be positioned longitudinally therebetween. The stop plate 41 embodies at its lower end a horizontally extending leg 44 and is secured fixedly to the platform 40 by way of bolts 45 which extend downwards through the leg and into the platform. In connection with use of the unit 12 the ham charged container 10 is placed on the platform 40 so as to extend longitudinally thereof and is then slid to the left as viewed in Figure 3 in order to bring one end thereof into abutment with the stop plate 41. The abutment plate 42 extends vertically and is shaped and adapted to fit slidably in said one end of the container and engage the adjacent end of the ham $h$. It is supported for adjustment to and from the stop plate 41 by way of a horizontal screw shaft 46, the central portion of which extends loosely through an oversized hole 47 in the central portion of the stop plate 41. The inner end of the screw shaft is connected by a swivel connection 48 to the central portion of the abutment plate 42 and the outer end of the screw shaft extends through a screw threaded bore in a block 49. The block is disposed outwards of the stop plate 41 and is fixedly connected to the platform 40. The hand wheel 49a is fixedly secured to the outer extremity of the screw shaft 46 in order that such shaft may be turned in one direction or the other. When the screw shaft is turned in one direction it feeds inwards and results in adjustment of the abutment plate 42 away from the stop plate 41 and when the screw shaft is turned in the reverse direction it feeds outwards and results in movement or displacement of the abutment plate 42 towards the stop plate. When the ham charged container 10 is slid in the direction of the stop plate 41 the abutment plate 42 on the inner end of the screw shaft 46 enters the adjacent end of the container and is brought into contact or abutment with the ham. The cylinder and piston device 43 comprises a horizontally extending cylinder 50 and a piston 51 in the cylinder. The cylinder is fixedly secured to the platform 40 and has an outer head 52 and an inner head 53. The piston 51 is slidably mounted in the cylinder between the heads 52 and 53 and is provided with a rod 54 which extends through a packing gland 55 in the inner head 53 and embodies at its outer end an abutment plate 56. Such plate is shaped and adapted when the device 43 is energized, to slide into the adjacent end of the container and compresses in an endwise fashion the ham in the container. Fluid under pressure is introduced into the outer end of the cylinder by way of a valve controlled pipe 57.

When the unit 12 is to be used the container 10, after being charged with the ham $h$ by the apparatus 11, is placed on the platform 40 and is then slid lengthwise away from the cylinder and piston device 43 in order to bring one end thereof into abutment with the stop plate 41 and cause entry of the abutment plate 42 into the one end of the container. Thereafter fluid under pressure is introduced into the outer end of the cylinder 50 in order to cause movement of the piston 51 towards the inner head 53. In connection with sliding movement of the piston the abutment plate 56 enters the adjacent end of the container and coacts with the abutment plate 42 to compress the ham $h$ in an endwise manner. It is contemplated that the pressure that is exerted by the cylinder and piston device 43 will be such as uniformly to densify the ham from end to end.

After use of the unit 12 to compress the ham $h$ endwise within the container the spring loaded covers 13 are applied to the ends of the container by the unit 14 in order to maintain the ham under proper endwise compression during the cooking operation. Each of the covers 13 comprises a cover plate 58, a crosshead 59, a telescopic connection 60 between the cover plate and the crosshead, a spiral compression spring 61 and a pair of arms 62. The cover plates 58 of the covers 13 are shaped to fit and slide within the ends of the container 10. The crossheads 59 are spaced from, and located outwards of, the cover plates. The telescopic connections 60 consist of outwardly extending rods on the central portions of the cover plates and inwardly extending tubes on the central portions of the crossheads and permit the cover plates to slide to and from the crossheads. The spiral compression springs 61 of the covers surround the telescopic connections 60 and serve to urge the cover plates away from the crossheads. The inner ends of the spring 61 abut against the central portions of the cover plates and the outer ends of the springs abut against the central portions of the crossheads 59. The arms 62 are pivotally connected to diametrically opposite portions of the crossheads 59 and extend towards the cover plates 58. They are free to swing toward and away from one another and have ratchet-like teeth 63 along their inner portions. When the covers 13 are in place as shown in Figure 5, certain of the teeth 63 are adapted to interlock with the outwardly and inwardly extending flanges 15 on the ends of the container in order to hold the covers in connected relation with the container.

The unit 14 for applying the spring loaded covers 13 consists of an elongated, horizontally extending platform 64, an upstanding stop plate 65 at one end of the platform and an air cylinder 66 at the other end of the platform. The stop plate and air cylinder are spaced apart a sufficient distance to permit placement therebetween of the ham loaded container 10 and the spring loaded covers 13. The air cylinder 66 is fixedly secured to the platform 64 and has mounted therein a slidably mounted ram 67. It is arranged so that when fluid under pressure is introduced into it the ram 67 is caused to slide in the direction of the stop plate 65. In connection with use of the device 14 one of the spring loaded covers 13 is placed against the upstanding stop plate 65 and the other cover is placed against the outer end of the ram 67 of the air cylinder 66. As shown in Figure 4 the one cover is arranged with the crosshead in abutment with the stop plate and the other cover is arranged with its crosshead in abutment with the outer end of the ram. After properly positioning the two covers the ham charged container 10 is manipulated so as to bring one end thereof into surrounding relation with the cover plate of the cover that is against the stop plate 65. Thereafter the air cylinder 66 is energized so as to force the cover that is against the outer end of the ram towards the other cover. As the ram slides towards the upstanding stop plate 65 the cover plates 58 slide into engagement with the ends of the ham in the container and thereafter the springs 61 are compressed. When the springs are compressed to the desired extent the air cylinder is stopped and the arms 62 are swung into interlocked relation with the flanges 15 on the ends of the container. After the last mentioned operation the ram 67 is retracted and the ham charged container with the spring loaded covers in connected relation therewith is removed from the platform 64 of the unit 14. Upon removal from the unit 14 the container is as shown in Figure 5 and the ham therein is under lateral and endwise pressure.

After the spring loaded covers 13 are applied to the ends of the container 10 by the unit 14 the container is placed in a cooking environment in order to cook the ham. In most instances the cooking environment will be water which is slightly below the boiling point. After cooking, the ham, while in the container, is placed in a chilling compartment in order to chill and solidify the same. Upon chilling the ham retains the cross sectional shape of the container. After the ham has been chilled to the desired extent and for the proper length of time it is removed by forcing it out of the container. The finished product is of uniform length, width and height, and as previously pointed out, maintains its molded shape. It is substantially of uniform density and texture and is free from voids.

The herein described method of processing the ham h may be carried out both expeditiously and with facility and results in a most satisfactory product.

Whereas the method has been described in connection with processing of a fresh boneless ham it is to be understood that they may be also employed in connection with the processing of any generally tapered, fresh boneless solid piece of meat, the mean or average cross sectional area of which is greater than the cross sectional area of the container interior. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. That improvement in processing a tapered piece of fresh boneless meat by way of a funnel shaped member and a rigid tubular container of less cross sectional area than the maximum cross sectional area of the piece, which comprises positioning the funnel shaped member so that the small end thereof is in sealed and communicating relation with one end of the container, then inserting the piece into said funnel shaped member so that it engages the inner surface of the member and the small end thereof faces said one end of the container, then creating an air pressure differential whereby the pressure of the ambient air around the large end of the piece is under such greater pressure than the air in the container as to force the piece bodily into the container, and then removing the member from the container and permitting the piece to remain in the container for molding purposes.

2. That improvement in processing a tapered piece of fresh boneless meat by way of a funnel shaped member and a rigid tubular container of less cross sectional area than the maximum cross sectional area of the piece, which comprises positioning the funnel shaped member so that the small end thereof is in sealed and communicating relation with one end of the container, then inserting the piece into said funnel shaped member so that it engages the inner surface of the member and the small end thereof faces said one end of the container, then creating within the container such a vacuum as to cause the entire piece to move bodily into the container, and then removing the member from the container and permitting the piece to remain in the container for molding purposes.

3. That improvement in processing a tapered piece of fresh boneless meat by way of a funnel shaped members and a rigid tubular container of uniform cross section from end to end but of less internal cross sectional area than the maximum cross sectional area of the piece, which comprises first positioning the container vertically and thereafter arranging the funnel shaped member so that it is located over the container and its small end is in sealed and communicating relation with the upper end of the container, then inserting the piece into the funnel shaped member so that it engages the inner surface of the member and the small end thereof faces and extends into said upper end of the container, then creating an air pressure differential whereby the pressure of the ambient air around the large end of the piece is under such greater pressure than the air in the container as to force the piece bodily into the container, and then removing the member from the container and permitting the piece to remain in the container for molding purposes.

4. That improvement in processing a tapered piece of fresh boneless meat by way of a funnel shaped member and a rigid tubular container of uniform cross section from end to end but of less internal cross sectional area than the maximum cross sectional area of the piece, which comprises first positioning the container vertically and thereafter arranging the funnel shaped member so that it is located over the container and its small end is in sealed and communicating relation with the upper end of the container, then inserting the piece into the funnel shaped member so that it engages the inner surface of the member and the small end thereof faces and extends into said upper end of the container, then creating within the container such a vacuum as to cause the entire piece to move bodily into the container, and then removing the funnel shaped member from the container and permitting the piece to remain in the container to effect molding thereof.

5. That improvement in processing a tapered piece of fresh boneless meat by way of a funnel shaped member and a rigid tubular container of less cross sectional area than the maximum cross sectional area of the piece, which comprises positioning the funnel shaped member so that the small end thereof is in sealed and communicating relation with one end of the container, then inserting the piece into said funnel shaped member so that it engages the inner surface of the member and the small end thereof faces said one end of the container, then creating an air pressure differential whereby the pressure of the ambient air around the large end of the piece is under such greater pressure than the air in the container as to force the piece bodily into the container for molding purposes, then applying endwise pressure to both ends of the piece in the container in order substantially uniformly to densify said piece, and then while both ends of the piece in the container are subjected to endwise pressure cooking the piece.

References Cited in the file of this patent

UNITED STATES PATENTS

| Number | Name | Date |
|---|---|---|
| 1,157,016 | Lotz | Oct. 19, 1915 |
| 1,531,504 | Roberts | Mar. 31, 1925 |
| 1,970,193 | Riebel | Aug. 14, 1934 |
| 1,975,916 | Bech | Oct. 9, 1934 |
| 1,981,485 | Westin | Nov. 20, 1934 |
| 2,054,890 | Stampe | Sept. 22, 1936 |
| 2,084,806 | Hubenet | June 22, 1937 |
| 2,224,398 | Komarik | Dec. 10, 1940 |
| 2,304,260 | Keller | Dec. 8, 1942 |
| 2,335,738 | Casey | Nov. 30, 1943 |
| 2,514,028 | Cloud | July 4, 1950 |